United States Patent
Kohashi

(10) Patent No.: US 6,470,136 B1
(45) Date of Patent: *Oct. 22, 2002

(54) VIDEO RECORDING APPARATUS AND METHOD WITH RESERVED RECORDING FUNCTION FOR RECORDING PROGRAMS BROADCAST FROM ANY TIME ZONE

(75) Inventor: Yukari Kohashi, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,007

(22) Filed: Aug. 21, 1997

(30) Foreign Application Priority Data

Aug. 22, 1996 (JP) ............................... 8-221149

(51) Int. Cl.[7] ................................ H04N 5/76
(52) U.S. Cl. ........................................ 386/83; 386/95
(58) Field of Search ............................ 386/46, 83, 95, 386/86; 348/906, 468, 13; 455/181.1; H04N 5/76

(56) References Cited

U.S. PATENT DOCUMENTS

| | | | | |
|---|---|---|---|---|
| 4,908,707 A | * | 3/1990 | Kinghorn | 386/83 |
| 5,526,130 A | * | 6/1996 | Kim | 386/83 |
| 5,561,461 A | * | 10/1996 | Landis et al. | 386/95 |
| 5,608,534 A | * | 3/1997 | Park et al. | 386/83 |
| 5,686,954 A | * | 11/1997 | Yoshinobu et al. | 348/13 |
| 5,768,697 A | * | 6/1998 | Shirakawa | 455/181.1 |
| 5,802,244 A | * | 9/1998 | Kinebuchi | 386/83 |
| 5,805,230 A | * | 9/1998 | Staron | 348/468 |
| 5,812,209 A | * | 9/1998 | Nishigaki | 348/468 |
| 5,907,365 A | * | 5/1999 | Nishigaki et al. | 386/86 |

FOREIGN PATENT DOCUMENTS

| | | |
|---|---|---|
| DE | 195 16 808 | 11/1995 |
| EP | 0 312 795 | 4/1989 |
| EP | 0 312 798 | 4/1989 |

OTHER PUBLICATIONS

Patent Abstracts of Japan, vol. 18, No. 649 (P–1840), Dec. 9, 1994 & JP 06 251450 A (Sharp), Sep. 9, 1994.
Patent Abstracts of Japan, vol. 15, No. 469 (P–1281), Nov. 27, 1991 & JP 03 201237 A (Matsushita Electric Industrial), Sep. 3, 1991.

* cited by examiner

*Primary Examiner*—Huy Nguyen
(74) *Attorney, Agent, or Firm*—Frommer Lawrence & Haug LLP; William S. Frommer; Darren M. Simon

(57) ABSTRACT

A video recording apparatus having a storage means to store program reservation data and equipped with a reserved recording function which utilizes program ID superimposed on broadcast signal. This apparatus includes a time difference table to store data of time differences between the sites of broadcasting stations and a receiving site, and when the program ID is to be stored as reservation data, the program ID is corrected with reference to the time difference table and then the corrected data is stored. The program ID inputted as reservation data represents the hour at the receiving site. Therefore, even when PIL data are mutually different due to the time difference between any selected broadcasting station and the receiving site, reserved recording of a desired program can be performed exactly on the basis of PDC or VPS with mere setting of the relevant country by a user, hence enhancing the operability and reliability of the apparatus.

6 Claims, 15 Drawing Sheets

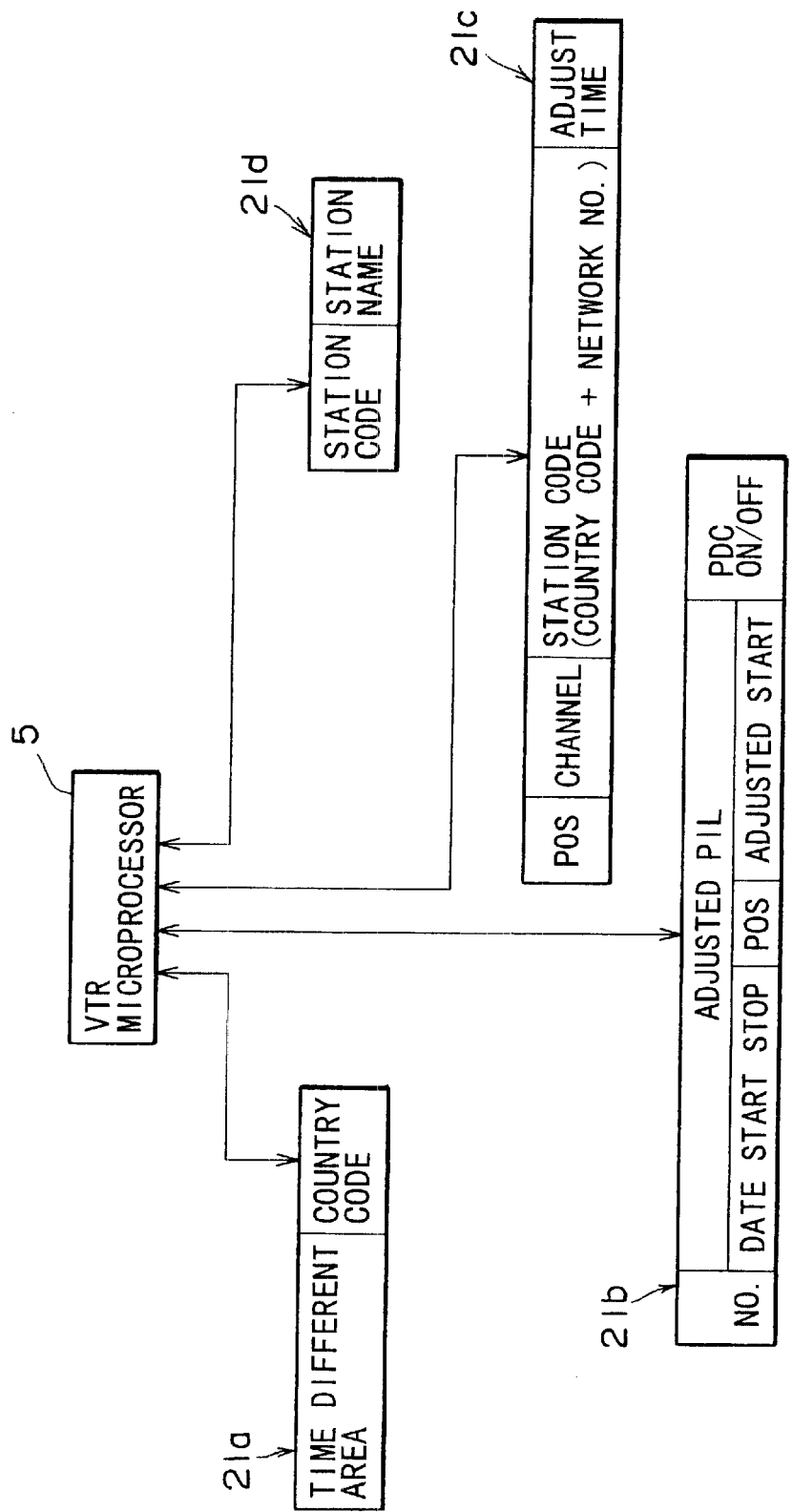

FIG. 2A

| TIME DIFFERENT AREA | COUNTRY CODE |
|---|---|
| AREA1 : UK | 2C |
| IRELAND | 42 |
| AREA2 : NETHERLANDS | 48 |
| GERMANY | 0D |
| BELGIUM | 16 |
| FRANCE | 2F |
| ⋮ | ⋮ |
| AREA1 : FINLAND | 26 |
| ⋮ | ⋮ |

FIG. 2B

| NO. | ADJUSTED PIL DATE START STOP | POS | ADJUSTED START | PDC ON/OFF |
|---|---|---|---|---|
| 1 | 1996. 4. 20 07 : 00-09 : 00 | 1 | 07 : 00 | ON |
| 2 | 1996. 4. 20 09 : 00-12 : 30 | 4 | 08 : 00 | ON |
| 3 | 1996. 4. 21 20 : 00-21 : 00 | 2 | 20 : 00 | ON |
| 4 | | | | |
| 5 | | | | |
| 6 | | | | |
| 7 | | | | |
| 8 | | | | |

FIG. 3A

| POS | CHANNEL | STATION CODE (COUNTRY CODE + NETWORK NO.) | ADJUST TIME |
|---|---|---|---|
| 1 | 10 | 4801 | ±0 |
| 2 | 8 | 4802 | ±0 |
| 3 | 2 | 4803 | ±0 |
| 4 | 23 | 2C2F | −1 |
| ⋮ | ⋮ | ⋮ | ⋮ |

| STATION CODE | STATION NAME |
|---|---|
| 4801 | NED1 |
| 4802 | NED2 |
| 4803 | NED3 |
| 2C2F | BBC1 |
| 2C3E | BBC2 |
| ⋮ | ⋮ |

| LANGUAGE | |
|---|---|
| ENGLISH | ITALIANO |
| DEUTCH | SPANISH |
| FRANCAIS | PORTUGUESE |
| NEDERLANDS | NORWAY |

SELECT ↑ ↓

PUSH EXECUTE

FIG. 5

| COUNTRY | |
|---|---|
| GERMANY | AUSTRIA |
| UK | SWEDEN |
| FRANCE | NORWAY |
| NETHERLANDS | BELGIUM |

SELECT ↑ ↓

PUSH EXECUTE

FIG. 6

| CHANNEL LIST | | | |
|---|---|---|---|
| POS | CH | STATION | GUIDECH |
| 1 | 2 | NED1 | 13 |
| 2 | 8 | NED2 | 14 |
| 3 | 10 | NED3 | 15 |
| 4 | 12 | CNN | --- |
| 5 | 18 | MTV | --- |

FIG.10A

```
TIMER SET CHACK

DATE                  START      STOP      PROG
---. ---    ---   ---:---   ---:---   ---
---. ---    ---   ---:---   ---:---   ---
---. ---    ---   ---:---   ---:---   ---

SELECT   [ ↑  ↓  ←  → ]
         PUSH     [  EXECUTE  ]
```

FIG.10B

```
TIMER SET CHACK

DATE                  START      STOP      PROG
20. 4    SAT   PDC    07 : 00  - 08 : 00     1
20. 4    SAT   PDC    09 : 00  - 12 : 30     4
21. 4    SUN   PDC    20 : 00  - 21 : 00     2

SELECT   [ ↑  ↓  ←  → ]
         PUSH     [  EXECUTE  ]
```

FIG. 13A

```
BBC1 UK STATION
  07 : 00-08 : 00   NEWS
  08 : 00-11 : 30   DRAMA
  11 : 30-14 : 00   MOVIE
  14 : 00-16 : 00   DOCUMENTARY
```

FIG. 13B

```
NED1 NETHERLANDS STATION
  07 : 00-09 : 00   NEWS
  09 : 00-11 : 00   MUSIC
BBC1 UK STATION
  08 : 00-09 : 00   NEWS
  09 : 00-12 : 30   DRAMA
  12 : 30-15 : 00   MOVIE
  15 : 00-17 : 00   DOCUMENTARY
```

FIG.14A

```
BBC1 UK STATION
  07:00-08:00    NEWS          → PIL 20 APR. 07:00
  08:00-11:30    DRAMA         → PIL 20 APR. 08:00
  11:30-14:00    MOVIE         → PIL 20 APR. 11:30
  14:00-16:00    DOCUMENTARY   → PIL 20 APR. 14:00
```

FIG.14B

```
NED1 NETHERLANDS STATION
  07:00-09:00    NEWS          → PIL 20 APR. 07:00
  09:00-11:00    MUSIC         → PIL 20 APR. 09:00
BBC1 UK STATION
  08:00-09:00    NEWS          → PIL 20 APR. 07:00
  09:00-12:30    DRAMA         → PIL 20 APR. 08:00
  12:30-15:00    MOVIE         → PIL 20 APR. 11:30
  15:00-17:00    DOCUMENTARY   → PIL 20 APR. 14:00
```

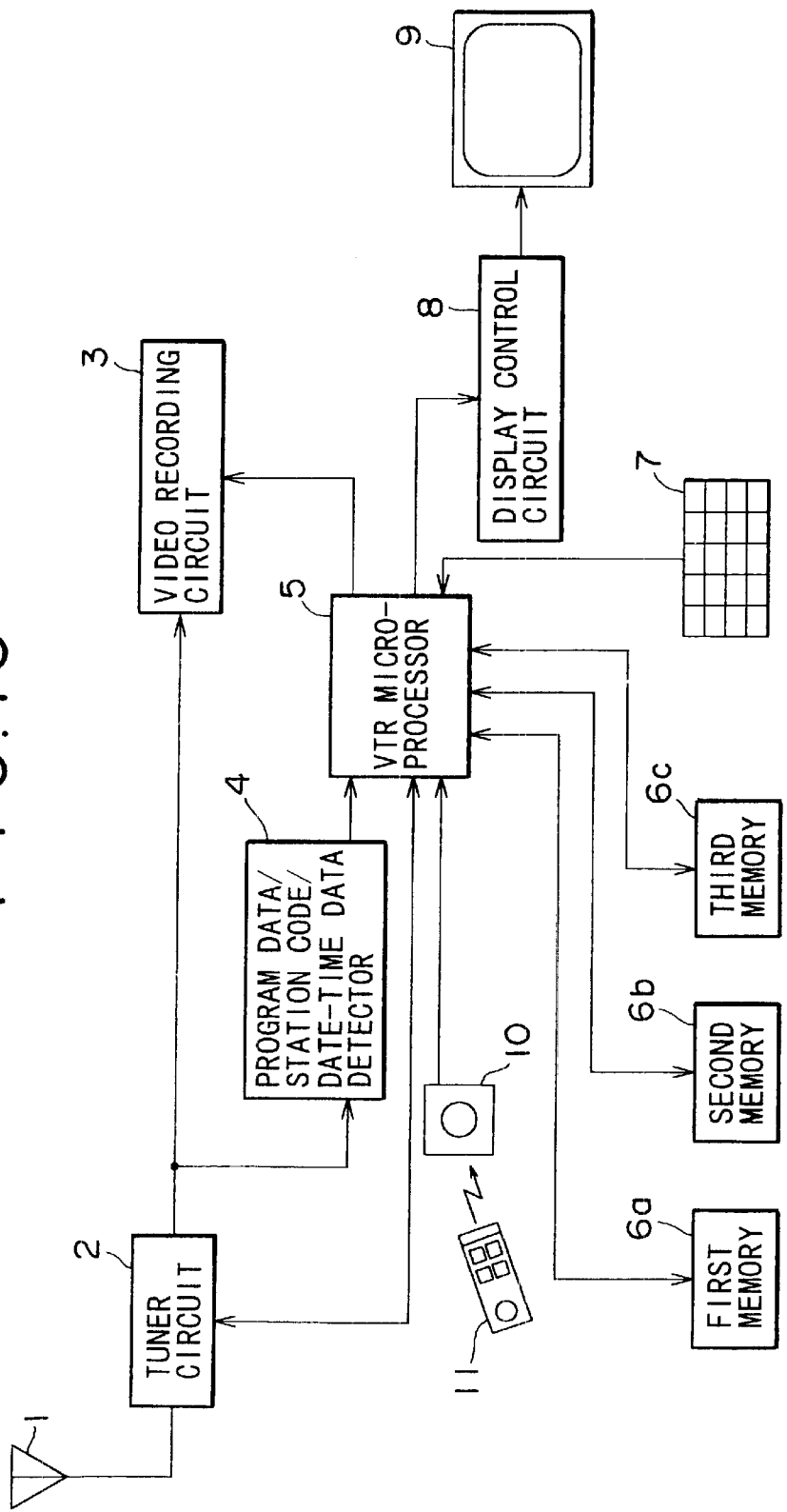

FIG. 16A

| NO. | PIL RESERVED | | | PDC ON/OFF |
|---|---|---|---|---|
| | DATE START STOP | POS | START | |
| 1 | 1996. 4. 20 07:00-09:00 | 1 | 07:00 | ON |
| 2 | 1996. 4. 20 09:00-12:30 | 4 | 09:00 | ON |
| 3 | 1996. 4. 21 20:00-21:00 | 2 | 20:00 | ON |
| 4 | | | | |
| 5 | | | | |
| 6 | | | | |
| 7 | | | | |
| 8 | | | | |

| POS | CHANNEL | STATION CODE |
|---|---|---|
| 1 | 10 | 4801 |
| 2 | 8 | 4802 |
| 3 | 2 | 4803 |
| 4 | 23 | 2C2F |
| ⋮ | ⋮ | ⋮ |

| STATION CODE | STATION NAME |
|---|---|
| 4801 | NED1 |
| 4802 | NED2 |
| 4803 | NED3 |
| 2C2F | BBC1 |
| 2C3E | BBC2 |
| ⋮ | ⋮ |

VIDEO RECORDING APPARATUS AND METHOD WITH RESERVED RECORDING FUNCTION FOR RECORDING PROGRAMS BROADCAST FROM ANY TIME ZONE

BACKGROUND OF THE INVENTION

1. Field of the Invention

The present invention relates to a video recording apparatus such as a VCR or VTR with a reserved recording function and also to a video recording method adapted to realize such a function. And more particularly, it relates to an apparatus and a method capable of performing a reserved recording operation exactly even when any time difference is existent between the standard time of a receiving site and that of a broadcasting station.

2. Description of the Related Art

In most of the continental countries such as the Netherlands, Belgium and so forth, it is possible to receive UK broadcasts (e.g., BBC1, BBC2, etc.) either directly or through CATV or the like via a broadcasting satellite.

Currently in Europe, there are many broadcasting stations which render services of transmitting broadcast programs by superimposing, on a vertical blanking interval of a television broadcast signal, a code representing "program data", "station ID" and "current date and time [UTC (Unified Time Coordinated)+LTO]".

These broadcast services are prescribed formally in Europe, including VPS Format diffused in Germany, Switzerland and Austria; 8/30/Format2 (PDC) diffused in the Netherlands and Belgium (Dutch zone), France and UK (United Kingdom); 8/30/Format1 diffused in UK and Belgium (French zone) and Italy; and Teletext Page Header diffused in entire Europe.

The concrete contents of such data include "program data", "station ID" and "current time" in VPS and PDC; "current date and time" in 8/30/Format1; and "station name" and "current (date) time" in Page Header.

Utilizing such broadcast service is effective to execute simplified reservation of video recording.

That is, the service of PDC or VPS is so performed that, as a broadcasting station transmits a program by superimposing, on the vertical blanking interval of a broadcast signal, ID (broadcast start hour) of the program being currently broadcast, hence enabling an apparatus, which is equipped with a reserved recording function, to comply flexibly to an extension of the program or a change of the start hour.

For example, in an apparatus equipped with a function of setting the current time, a date and a time can be set by the use of "current date and time" included in the function. Meanwhile in an apparatus with a function of recognizing "station ID", the name of the broadcasting station of the channel being currently received can be identified.

In another apparatus with a recording function (e.g., VCR or VTR), it is possible to perform reserved recording of a desired program of any broadcasting station by utilizing "program data".

More specifically, it is so prescribed that, in any broadcasting station conforming with the PDC or VPS, each of programs is labeled (termed PIL) in advance, and during broadcast of any one program, the label thereof is transmitted continuously.

In most cases, such program label signifies an actual broadcast start hour (in a county where the relevant station is sited), so that when the program is received in that country where no time difference is existent, effective use is possible.

With the exception of some particular case, the apparatus starts its recording operation upon reception of a coincident label, and stops the recording operation in response to noncoincidence of the label.

Generally, program tables of television broadcasts and the like are printed in newspapers or magazines.

FIGS. 13A and 13B show examples of program tables printed in newspapers or magazines, in which FIG. 13A represents an excerpt of the program table of BBC1 printed in the UK newspaper TV column, and FIG. 13B represents excerpts of program tables of the Netherlands NED1 and the UK BBC1 printed in TV magazines.

For example, the BBC1 program table of Apr. 20, 1996 printed in the UK newspaper TV column is such as shown in FIG. 13A.

When a user living in the UK reads the program table of FIG. 13A and wants to reserve timed recording of the documentary which starts at 15:00, then the user makes a reservation of the BBC1 program starting at 15:00 on Apr. 20, 1996.

In another exemplary case, when a user living in the Netherlands reads the NED1 program table of FIG. 13B printed in a Dutch TV magazine and wants to reserve timed recording of a desired program, the user makes a similar reservation.

FIGS. 14A and 14B represent PDC program labels (PIL) relative respectively to the program tables shown in FIGS. 13A and 13B.

In FIGS. 14A and 14B showing examples of program ID set in the program tables of FIGS. 13A and 13B by broadcasting stations, FIG. 14A represents a program table of BBC1 and its program ID, and FIG. 14B represents a program table and its program ID of NED1 in the Netherlands and those of BBC1 in the UK.

Since the UK BBC1 is a broadcasting station conforming with the PDC, the program ID (program label: PIL) of the table shown in FIG. 13A is such as represented in FIG. 14A.

Regarding NED1 in the Netherlands also, the program ID of the table shown in FIG. 13B is such as represented in FIG. 14B.

However, since the program ID of the program table is set by each broadcasting station, it is kept unchanged regardless of any of different receiving sites. Although the program ID of the program tables shown in FIGS. 14A and 14B are not printed in TV columns of newspapers or magazines, PDC program ID are additionally annexed here to the program table of the UK BBC1 printed in a Dutch TV magazine, so as to explain the program ID. In this case, the hours signify those in the UK where the broadcasting station is sited.

The following explanation will be given on an exemplary case where a user living in the Netherlands makes a reservation according to the program table shown in FIG. 13B.

Dutch TV magazines published in the Netherlands carry Dutch broadcast hours.

When a user reserves news of NED1 at 07:00 and a drama of BBC1 at 09:00, there are registered, in an internal memory for reservation data in a video recording apparatus, data of 1996.4.20 07:00–09:00 (Pos1: NED1) as PIL Reserved (reserved program) No. 1, and also data of 1996.4.20 09:00–12:30 (Pos4: BBC1) as PIL Reserved No. 2.

The state of registration of such data will be described below with the structure of a video recording apparatus.

FIG. 15 is a function block diagram showing a structural example of principal components in a video recording apparatus equipped with a known reserved recording function. In this diagram, there are included an antenna 1, a tuner circuit 2, a video recording circuit 3, a data detector (program data/station code/date-time data detector) 4, a VTR microprocessor 5, first to third memories 6a–6c, a key input manipulator 7, a display control circuit 8, a monitor TV unit 9, an infrared sensing circuit 10, and a remote commander 11.

In the video recording apparatus with a reserved recording function shown in FIG. 15, data of reserved recording set by the user are stored in the first to third memories 6a–6c.

In the first memory 6a, there is stored the data of reserved program.

Meanwhile the Pos data set in the video recording apparatus is stored in the second memory 6b, and the data of station code and station name is stored in the third memory 6c.

The contents of the data stored in the first to third memories 6a–6c are such as those shown in FIGS. 16A to 16C respectively.

FIGS. 16A to 16C are explanatory diagrams representing the states of storage of such data in individual areas of the first to third memories shown in FIG. 15. FIG. 16A shows the content of the first memory 6a to store the reserved program data; FIG. 16B shows the content of the second memory 6b to store the Pos data; and 16C shows the content of the third memory 6c to store the station code and station name data.

As shown in FIG. 16A, the reserved program data is composed of "PIL Reserved" and "PDC ON/OFF".

Regarding "PIL Reserved" No. 1, as described above, there are stored 1996.4.20 07:00–09:00, a POS dat "1" and PIL (broadcast start hour, i.e., 07:00 in this case).

Since NED1 conforms with the PDC, "PDC ON/OFF" is set to ON. In the UK or any similar country where there are many broadcasting stations conforming with the PDC, it may be initially set to ON in a reserved recording operation automatically.

As for "PIL Reserved" No. 2 which is a program of the UK broadcasting station "BBC1", both "PIL Reserved" and "PDC ON/OFF" are stored in accordance with the program of FIG. 13B and the program ID of FIG. 14B.

The Pos data stored in the second memory 6b is composed of CH (channel) and station code, as shown in FIG. 16B.

The Pos data is settable per video recording apparatus.

In the case of FIG. 16B, Pos1 is CH "10", station code is "4801" of "NEDL", Pos4 is CH "23", and station code is "2C2F" of "BBC1".

In the third memory 6c, the data of station code and station name are stored.

FIG. 16C shows codes of "NEDL" to "NED3" representing the Netherlands broadcast stations, and codes of "BBC1" and "BBC2" representing the UK broadcasting stations.

A station code is composed of four-digit numerical data, wherein high-order two digits are used as a country code which is allocated to each relevant country to represent the same.

In the third memory 6c of FIG. 16C, the station code of Pos1 is "4801", and the country code thereof is "48".

Therefore, the cases of FIGS. 16B and 16C signify exemplary states where Pos1 is preset to NED1, Pos2 to NED2, Pos3 to NED3, and Pos4 to BBC1, respectively.

Input of such reservation data is executed by manipulating an up, down, left or right cursor key ("↑", "↓", "←", or "→") of the remote commander 11. A detailed explanation thereof is omitted here.

As described already, any broadcasting station conforming with the PDC or VPS continuously transmits the label of a program (program ID) during broadcast of that program.

For example, at the time of a news broadcast, NED1 continuously transmits PIL of "Apr. 20, 1996 07:00" as program ID set individually by the station.

Similarly, BBC1 also keeps transmission of the program ID set individually by the station.

In the video recording apparatus of FIG. 15 equipped with a reserved recording function, broadcast signals of the reserved channels (in this example, Pos1 of NED1 channel and Pos4 of BBC1 channel) are received in succession alternately by the tuner circuit 2 at a predetermined time interval for each channel, and the VTR microprocessor 5 controls the data detector 4 to extract the data superimposed on the received broadcast signals.

Since the program of NED1 is transmitted from the same country as the one where the user lives, the program ID set by the broadcasting station is fundamentally the same as PIL of "Apr. 20, 1996 07:00" with regard to the program start hour, and during a news broadcast, such PIL superimposed on the broadcast signal is transmitted from the station.

In response to selection of NED1 (Pos1), the VTR microprocessor 5 instructs execution of reserved recording, as the detected PIL coincides with PIL Reserved No. 1 stored in the first memory 6a, i.e., Apr. 20, 1996 07:00 NED1 (Pos1).

Meanwhile regarding the program of BBC1, the program ID set by the broadcasting station coincides with the program start hour in the transmission source (UK).

In this case, PIL is "Apr. 20, 1996 08:00", and this PIL is transmitted continuously during broadcast of the drama.

However, in the Netherlands, the program start/end times of BBC1 are each shifted by one hour from the time in the source country UK.

Therefore, when the VTR microprocessor 5 has selected BBC1 of Pos4, the detected PIL is "Apr. 20, 1996 08:00", but the PIL extracted from PIL Reserved No. 2 in the first memory 6a is "Apr. 20, 1996 09:00".

Consequently, the VTR microprocessor 5 fails to detect a coincidence between the PILs, whereby it is rendered impossible to perform proper recording of the reserved program.

The PDC program ID (PIL) is fundamentally the data incidental to the program, and when the program transmission source is in the UK, it is customary that PIL for the UK is annexed regardless of any receiving site. Accordingly, as shown in FIG. 14B representing some programs and incidental program ID (PIL) data, any program table in magazines or the like published in the Netherlands is based on the Netherlands time, whereas the program ID (PIL) is based on the transmission source UK time, as shown in FIG. 14A.

In general, a program starting at 13:00 for example in the UK is expressed as PIL=13:00.

In the Netherlands, Belgium or any other country where this program is receivable either directly or through CATV via the satellite, the program starts at 14:00.

Therefore, at the time of manipulation for a reservation in a recording apparatus such as VCR with a reserved recording function, a reservation is made with a decision as PIL=14:00.

However, since the UK station keeps continuous transmission of PIL=13:00 during broadcast of this program, no label coincidence is attained with PIL=14:00 despite continuous search for the label of this broadcast in the recording apparatus, so that a recording operation is never begun to consequently fail in performing the desired reserved recording.

In another example where a sport program is suddenly extended or the broadcast time of a certain program is changed due to some other program, it is also impossible to comply properly with such a situation.

As described in connection with the related art, services known as PDC and VPS are currently carried out in Europe and so forth.

When reserved recording is performed by utilizing the PDC or VPS, a video recording apparatus such as a VCR holds the reserved program content (program data) in an internal RAM (random-access memory), wherein the content is compared with the program code (PIL) transmitted from the station during actual broadcast of the program, and the program is recorded only when a coincidence is attained therebetween (with the exception of a special code).

However, in case no coincidence is attained therebetween, no recording is performed at all. Therefore, when recording a program of the channel of any broadcasting station in another country having a time difference, if a user manipulates the apparatus for executing a reservation by the same procedure as that for the same program of the corresponding channel in the user's country, there arises a problem that the desired program is not recordable, since no coincidence is attained between the content of the reserved program and the PIL transmitted thereto.

SUMMARY OF THE INVENTION

It is an object of the present invention to provide improvements in a video recording apparatus and method adapted for enhancing both operability and reliability, wherein, when reserved recording is to be performed by utilizing PDC or VPS, a desired program can be recorded exactly with a reservation through mere setting of a country by a user despite different PIL data derived from the time difference between a broadcasting station and a receiving site.

According to an aspect of the present invention, there is provided a video recording apparatus having a storage means to store program reservation data and equipped with a reserved recording function which utilizes program ID superimposed on broadcast signal. In this apparatus, a time difference table is included to store data of time differences between the sites of broadcasting stations and a receiving site, and when the program ID is to be stored as reservation data, the program ID is corrected with reference to the time difference table and then the corrected program ID is stored.

Consequently, it becomes possible to realize proper reserved recording in accordance with broadcast service such as PDC or VPS, hence facilitating manipulation of the apparatus remarkably. And adequate compliance is achievable in conformity with a temporal extension of any program or a change thereof.

The above and other features and advantages of the present invention will become apparent from the following description which will be given with reference to the illustrative accompanying drawings.

BRIEF DESCRIPTION OF THE DRAWINGS

FIG. 1 is a function block diagram of a preferred embodiment which represents the video recording apparatus of the present invention equipped with a reserved recording function;

FIGS. 2A and 2B show how data are stored in fourth and fifth memories included in the apparatus of FIG. 1;

FIGS. 3A and 3B show how data are stored in sixth and seventh memories included in the apparatus of FIG. 1;

FIG. 4 shows an example of a language setting menu displayed on the screen of a monitor TV unit;

FIG. 5 shows an example of a country setting menu displayed on the screen of the monitor TV unit;

FIG. 6 shows an example of a receivable channel list displayed on the screen of the monitor TV unit;

FIGS. 10A and 10B show examples of a reserved recording set menu displayed on the screen of the monitor TV unit;

FIGS. 13A and 13B show examples of program tables printed in newspapers, magazines or the like;

FIGS. 14A and 14B show examples of program ID preset by broadcasting stations in the program tables of FIGS. 13A and 13B;

FIG. 15 is a function block diagram showing an exemplary configuration of principal components in a video recording apparatus of the related art having a reserved recording function; and FIGS. 16A to 16C are explanatory diagrams showing how data are stored in the respective areas of first to third memories included in the apparatus of FIG. 15.

DESCRIPTION OF THE PREFERRED EMBODIMENTS

Figure 7:
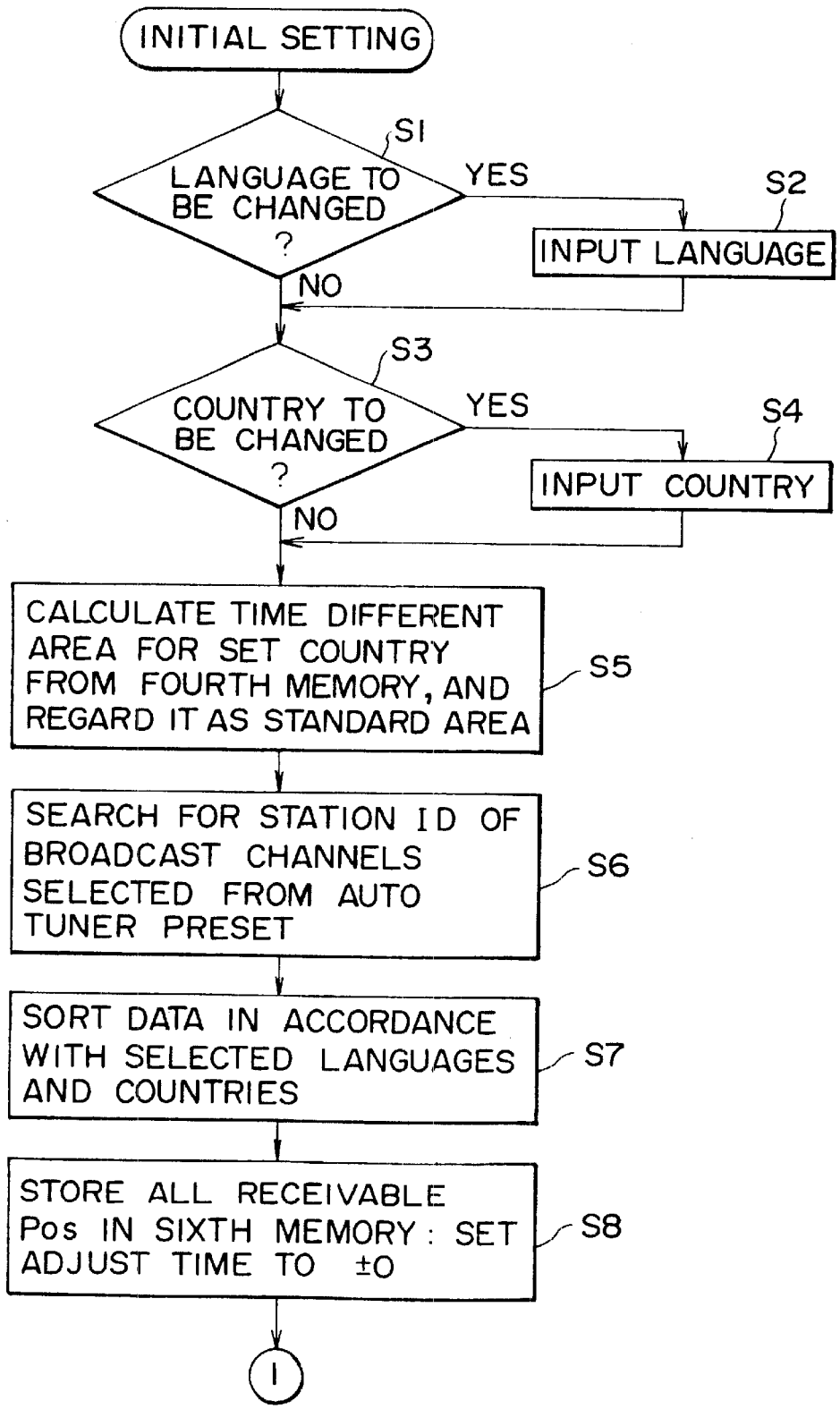
FIG. 7 is a flowchart showing a principal processing flow at initial setting in the video recording apparatus of the present invention.

In a video recording apparatus such as a VCR equipped with a reserved recording function, the feature of the present invention resides in that, regarding any program of a broadcasting station where its standard time is different from that of a user's country (any country or site having a time difference), proper reserved recording can be performed in accordance with program ID such as VPS or PDC.

More specifically, in an apparatus to perform reserved recording by utilizing PDC or VPS, the user needs merely to set a desired country in advance, so that the apparatus searches for "station ID" automatically out of the preset channels and then finds out the channel of the user's country, hence acquiring LTO (Local Time Offset) data of the user's country from the data of 8/30/Format1 or Page Header service.

Subsequently the data of the reserved program set by the user is corrected in accordance with the data thus acquired, and then a coincidence of the PIL data is detected, whereby a desired broadcast program of any time-different country can be recorded accurately with a reservation.

FIG. 1 is a function block diagram of a preferred embodiment which represents the video recording apparatus of the present invention equipped with a reserved recording function. Reference numerals in this diagram are similar to those used in FIG. 15, wherein numerals 21a to 21d denote fourth to seventh memories.

In order to make the invention better understood, FIG. 1 shows only a VTR microprocessor 5 and four memories, i.e., fourth to seventh memories 21a–21d. However, the constitution of this apparatus is fundamentally the same as that of the aforementioned apparatus of FIG. 15 with the exception that the number of the memories and the contents thereof are different.

In the related art of FIG. 15, the data of program reservation are stored in the first to third memories 6a–6c respectively.

Meanwhile the data of program reservation, of which details are shown in FIGS. 2 and 3, are stored in the fourth to seventh memories 21a–21d of FIG. 1.

Briefly, the relationship of mutual correspondence between the first to third memories 6a–6c of FIG. 15 and the fourth to seventh memories 21a–21d of FIG. 1 is such that the first to third memories 6a–6c correspond substantially to the fifth to seventh memories 21b–21d, and the fourth memory 21a of FIG. 1 is newly added.

FIGS. 2A and 2B show the storage states of data in the fourth and fifth memories 21a and 21b of FIG. 1, wherein FIG. 2A relates to the fourth memory 21a, and FIG. 2B to the fifth memory 21b respectively.

FIGS. 3A and 3B show the storage states of data in the sixth and seventh memories 21c and 21d of FIG. 1, wherein FIG. 3A relates to the sixth memory 21c, and FIG. 3B to the seventh memory 21d respectively.

Time difference area tables for individual countries are provided in the fourth memory 21a newly added.

As shown in FIG. 2A, a time difference area, countries and an area name are described with mutual correspondence in each time difference area table.

For example, the area 1 includes UK and Ireland, and a two-digit country code explained in connection with FIGS. 16B and 16C is given correspondingly to each of the countries.

Next in the fifth memory 21b of FIG. 2B, data of the corrected PIL (broadcast start hour) is stored instead of the PIL (broadcast start hour, e.g., 09:00) in the first memory 6a of FIG. 15A.

A reserved recording operation is executed on the basis of the corrected PIL (broadcast start hour).

Thus, in order to correct the PIL (broadcast start hour), the adjust time data in the second memory 6b of FIG. 15B is added to the sixth memory 21c of FIG. 3A.

The content of the seventh memory 21d shown in FIG. 3B is the same as that of the third memory 6c shown in FIG. 15C.

In the video recording apparatus of the present invention having a reserved recording function, the program reservation data shown in FIGS. 2A, 2B, 3A and 3B are stored respectively in the fourth to seventh memories 21a–21d.

For clarifying the difference between the related art and the present invention, the diagrams show an exemplary case where the program reservation data stored in the fourth to seventh memories 21a to 21d and the contents (program reservation data) in the first to third memories 6a to 6c of FIGS. 15A to 15C are mutually the same.

In the aforementioned example of the related art, when a user living in the Netherlands selects BBC1 of Pos4, the detected PIL is "Apr. 20, 1996 08:00", whereas the PIL extracted from PIL Reserved No. 2 in the first memory 6a is "Apr. 20, 1996 09:00", so that no coincidence is attained therebetween to consequently fail in performing a reserved recording operation.

In contrast with the above, according to the present invention, there occurs none of such uncoincidence between the PIL data despite a manipulation for reservation at the Netherlands standard time, since the corrected PIL (08:00) is stored in the fifth memory 21b shown in FIG. 2B, whereby a reserved recording operation is performed properly with certainty.

In short, when a reserved recording operation based on the PDC or VPS is performed in a video recording apparatus such as a VCR with a reserved recording function, the label of the reserved program is held in the internal RAM (memory) of the apparatus, and a search is executed continuously while the broadcast signal is being received until arrival of the same label.

However, in case time-different countries are mutually adjacent as in Europe for example, the actual broadcast start hour and the PDC or VPS label are not exactly coincident at the time of receiving a broadcast from any other time-different country.

Consequently, it has been impossible heretofore in any other country to execute simple reserved recording of a desired broadcast program from a station of one country in conformity with the PDC or VPS broadcasting service.

According to the present invention, the data of "station ID (Country Code+Network Identification)" relative to the transmission channel of a reserved program and "current date and time" thereof are checked, and then a decision is made as to whether the channel is in any country having a time difference from the user's country (receiving site). And if the result of such a decision signifies that the channel is in a time-different country, the label of the reserved program held in the internal RAM (memory) of the apparatus is changed to a value obtained by adding the time difference {(LTO of user's country)–(LTO of transmission channel of reserved program)}.

Due to the above processing, the two PIL data are rendered coincident with each other to thereby enable reserved recording based on the PDC or VPS.

Next, an explanation will be given on the feature function of the video recording apparatus of the present invention, i.e., relative to a manipulation for executing reserved recording on the basis of the PDC or VPS regardless of any time difference with respect to a transmitting station.

The function is broadly classified into an initial set mode, a program reservation set mode and a reserved recording mode, which will be described below successively in this order.

The apparatus is placed in an initial set mode by depressing an "automatic initial set" key disposed in a key input manipulator 7 (FIG. 15; omitted in FIG. 1).

In this initial set mode, a language set menu, a country set menu and a channel list are displayed sequentially on the screen of a monitor TV unit 9.

FIG. 4 shows an example of a language set menu displayed on the monitor TV unit 9.

FIG. 5 shows an example of a country set menu displayed on the monitor TV unit 9.

And FIG. 6 shows an example of a receivable channel list displayed on the monitor television unit 9.

First, a language set menu such as shown in FIG. 4 is displayed on the screen of the monitor TV unit 9.

When "NEDERLANDS" is indicated on the language set menu of FIG. 4, this portion is displayed with, e.g., a reverse representation (in a different color).

In the state where a desired language is indicated by manipulating an up "↑" or down "↓" cursor key of a remote commander 11, an "EXECUTE" key is depressed to select the indicated language.

Upon selection of the desired language, the display on the screen of the monitor TV unit 9 is switched to a country set menu such as shown in FIG. 5.

In this case also, when "NETHERLANDS" is indicated on the country set menu similarly to the foregoing example of FIG. 4, this portion is displayed with, e.g., a reverse representation (in a different color).

Subsequently the desired country is indicated by manipulating the up or down cursor key of the remote commander 11, and then the "EXECUTE" key is depressed to select the indicated country.

Whenever necessary, a channel list is displayed.

The VTR microprocessor 5 shown in FIG. 1 calculates the time difference of the preset country from the time difference area table in the fourth memory 21a where the time difference data of the listed countries are stored.

Since "NETHERLANDS" is selected in this case, the area 2 of the time difference area table is regarded as a standard.

Next the VTR microprocessor 5 controls a tuner circuit 2 and a data detector circuit 4 (of FIG. 15) to thereby tune in the entire receivable channels automatically, and then extracts the station ID data superimposed on the broadcast waves of the channels.

Further, sorting is executed in accordance with the preset languages and countries by the use of such station ID data.

And the data thus obtained are stored in the sixth memory 21c of FIG. 3A.

In this case, the adjust time in the sixth memory 21c is set to ±0 as an initial value.

Subsequently, in order to obtain the standard time data, a search is executed for the channel (Pos) that has the country code belonging to the same area as the standard area set by the user in the fourth memory 21a of FIG. 2A.

In this case, first the Pos is set to its initial value "1", and the station code of such Pos1 is read out from the sixth memory 21c of FIG. 3A.

As mentioned, each broadcasting station code is composed of four-digit numerical data, of which high-order two digits are used as a country code representing the relevant country.

In the sixth memory 21c of FIG. 3A, the station code of Pos1 is "4801", so that the country code is "48".

Referring to the time difference table in the fourth memory 21a of FIG. 2A, it is seen that the time difference of this country code "48" corresponds to the area 2 and is therefore the same as in the standard area.

When the area is different from the standard area, Pos is changed by "+1" to be set to Pos2.

Thus, in case the area is different from the standard area, a process of "+1" is executed sequentially up to a maximum of MAXPos in the same manner as the above.

And upon coincidence between the Pos time-different area and the standard area, the channel of that Pos is selected, then the date and time data on the 8/30/Format1 service data is acquired, and the counter in the VTR microprocessor 5 of FIG. 1 is actuated to start its internal clock operation in synchronism with the acquired data.

In case none of date and time data is acquired, the Pos is incremented by +1 and then the standard time data is sought again. This process is repeated up to MAXpos.

When the standard time data has been obtained, the time data of the next registered channel is extracted, and the difference from the standard time is calculated and processed as adjust time data.

Initial setting is executed with such manipulation and operation in the above procedure.

The processing described is shown in flowcharts below.

Figure 8:
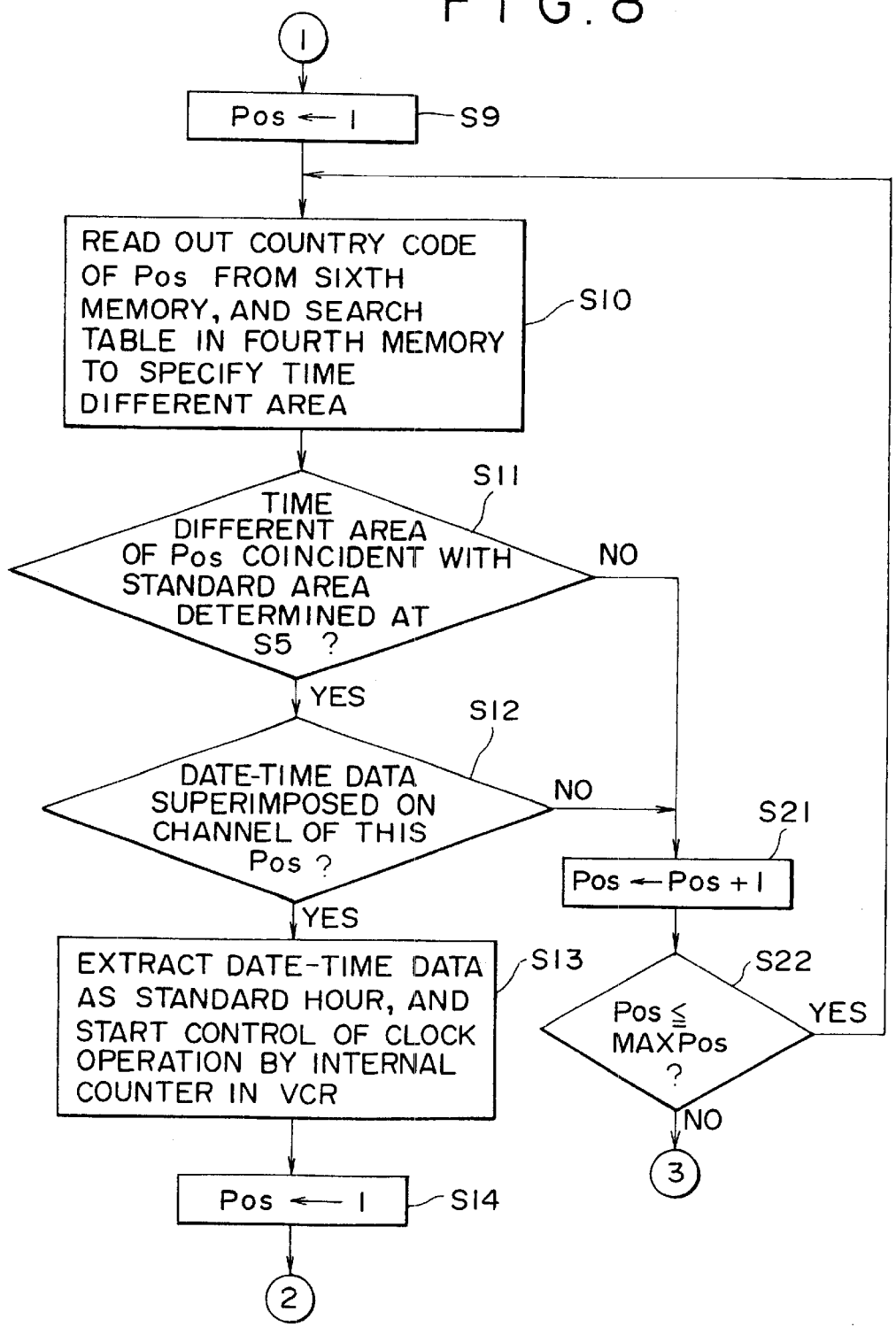
FIG. 8 is another flowchart showing the principal processing flow at initial setting in the video recording apparatus of the invention.
Figure 9:
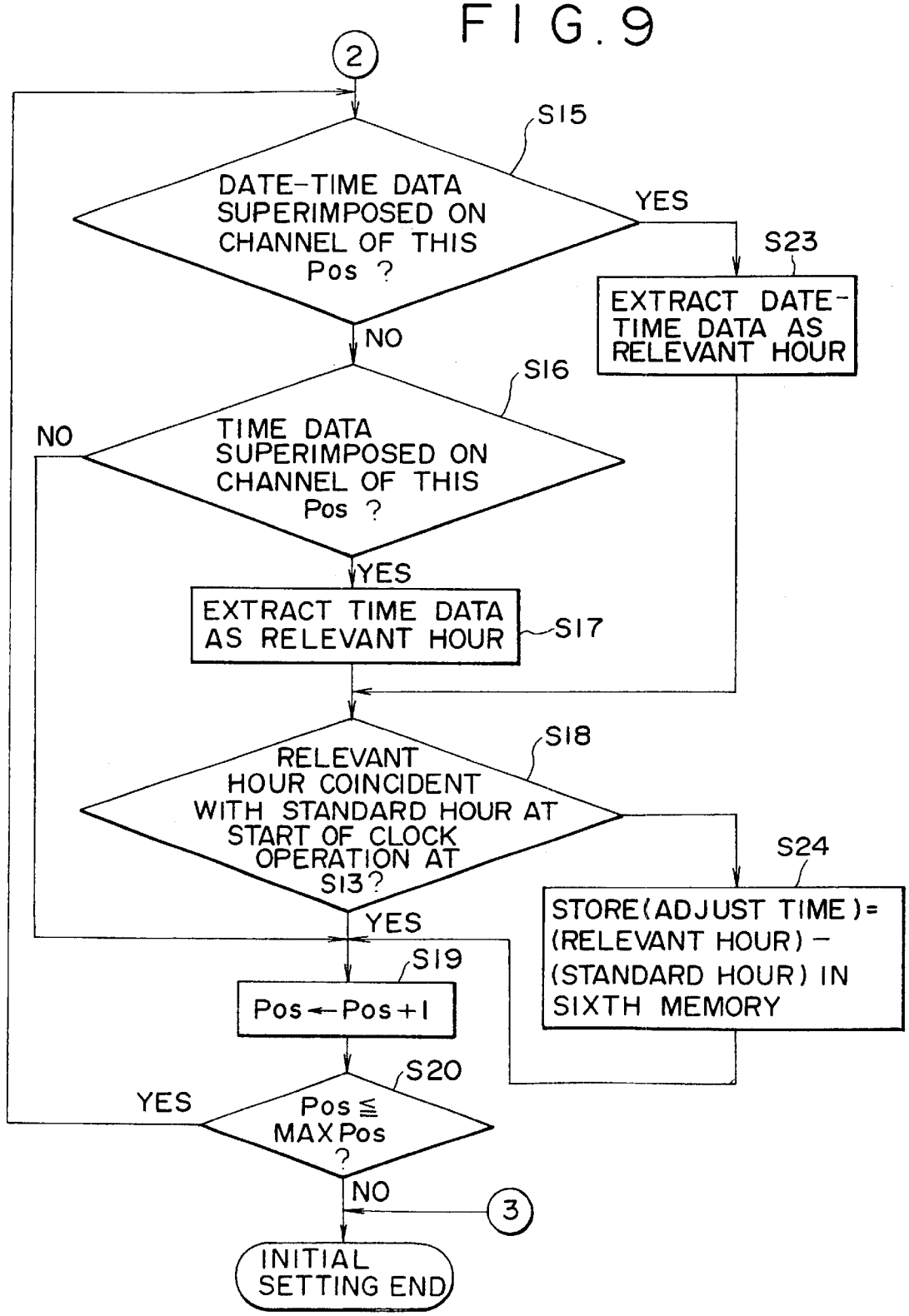
FIG. 9 is a further flowchart showing the principal processing flow at initial setting in the video recording apparatus of the invention.

FIGS. 7 to 9 are flowcharts showing a flow of principal processes executed at initial setting in the video recording apparatus of the present invention. In these diagrams, S1 to S24 denote processing steps, and (1) to (3) denote connections.

In response to a designation of initial setting in the video recording apparatus, a processing flow of FIG. 7 is started, and a decision is made at step S1 as to whether a language is to be set or changed.

If the result of this decision is yes to signify that a language is to be set or changed, the operation proceeds to step S2, where a desired language is selected on the aforementioned language set menu shown in FIG. 4.

When no language is to be set or changed or upon completion of setting or changing a language, a decision is made at step S3 as to whether a country is to be set or changed.

And if the result of the above decision is yes to signify that a country is to be set or changed, the operation proceeds to step S4, where a desired country is selected on the aforementioned country set menu shown in FIG. 5.

Meanwhile, when no country is to be set or changed or upon completion of setting or changing a country, the VTR microprocessor 5 calculates, at step S5, the time difference relative to the set country with reference to the time difference area table of countries shown in FIG. 2A, and thus a standard area is determined.

At next step S6, a search is executed for station ID of entire receivable channels (CH), and station ID data superimposed on the tuned channels are also extracted.

Subsequently at step S7, sorting is executed in accordance with the languages and countries by the use of such station ID data.

And at step S8, the sorted data are stored in the sixth memory 21c of FIG. 3A. In this case, the adjust time in the sixth memory 21c is set to "+0" as an initial value.

Subsequently, in order to obtain the standard hour, a search is executed for the channel (Pos) which has a country code belonging to the same area as the standard area set by the user.

First the operation proceeds to step S9 (from connection (1) of FIG. 7 to connection (1) of FIG. 8), where Pos is set to its initial value "1".

At next step S10, since Pos=1 in this state, the station code of Pos1 is read out from the sixth memory 21c shown in FIG. 3A, and a search is executed to specify the relevant time-different area.

Then at step S11, a decision is made as to whether a coincidence is attained or not between the time-different area of Pos1 and the standard area determined at step S5.

When a coincidence is attained between the time-different area of Pos1 and the standard area, the operation proceeds to step S12, where a decision is made as to whether the date and time data are superimposed on the channel of Pos1.

If the result of this decision signifies that the date and time data are superimposed, the operation proceeds to step S13, where the date and time data are extracted to be used as a standard hour, whereby the internal counter in the apparatus is actuated to start control of a clock operation.

When the standard hour has thus been acquired, the operation proceeds to a next process of extracting the time data of the channel registered in each Pos, then calculating the difference thereof from the standard hour, and inputting the time data as an adjust time.

At step S14, Pos is set to its initial value "1" Thereafter at next step S15 (from connection (2) of FIG. 8 to connection (2) of FIG. 9), since Pos=1 in this state, a decision is made as to whether the date and time data are superimposed or not on the channel of, e.g., 8/30/Format1.

If the result of the above decision signifies that the date and time data are superimposed, such data are acquired, at step S23, as 8/30/Format1 service data to be used as a relevant hour, and then the operation proceeds to step S18.

Meanwhile, in case the result of the decision at step S15 signifies that none of date and time data are superimposed, the operation proceeds to step S16, where another decision is made as to whether the date and time data are superimposed on the channel of, e.g., Teletext Page Header.

And if the result of the above decision signifies that the date and time data are superimposed, such data are acquired, at step S17, as Teletext Page Header service data to be used as a relevant hour, and then the operation proceeds to step S18.

Subsequently, a decision is made at step S18 as to whether the relevant hour is coincident with the standard hour corresponding to the start of the clock operation determined at step S13.

Meanwhile, if the relevant hour is not coincident with the standard hour, the operation proceeds to step S24, where the adjust time obtained by calculating the difference between the relevant hour and the standard hour is stored in the adjust time column of the pertinent Pos in the sixth memory 21c of FIG. 3A, and then the operation proceeds to step S19.

In case a coincidence is attained between the relevant hour and the standard hour, the Pos is incremented by +1 at step S19 for repeating the same process at the next Pos.

Thereafter a decision is made at step S22 as to whether the Pos is smaller than the maximum value (MAXPos) or not.

And when the Pos is smaller than the maximum value (MAXPos), the operation returns to step S10 again, and then the foregoing process is repeated.

If the result of the decision at step S11 signifies no coincidence between the time-different area of Pos1 and the standard area or if the result of the decision at step S12 signifies no superimposition of date and time data, the operation proceeds to step S21 where the Pos is incremented by +1.

Subsequently at step S22, a decision is made as to whether the Pos is smaller than the maximum value (MAXPos) or not.

And when the Pos is smaller than the maximum value (MAXPos), the operation returns to step S10 again, and then the foregoing process is repeated.

Thus, initial setting is completed due to the above processes executed at steps S1 to S24, and program reservation is rendered settable. That is, completion of initial setting is the requisite condition to set program reservation.

Hereinafter an explanation will be given on setting of program reservation.

For example, when a user living in the Netherlands sets reservation of a program dated Apr. 20, 1996 as in the aforementioned case of the related art, the user performs the following manipulation.

First the user pushes the menu key of the remote commander 11.

In this case, the video recording apparatus such as a VCR having a reserved recording function receives a command via the infrared sensing circuit 10, whereby a reserved recording set menu is displayed on the screen of the monitor TV unit 9 under control of the display control circuit 8.

FIGS. 10A and 10B show examples of a reserved recording set menu displayed on the screen of the monitor TV unit 9, in which FIG. 10A represents an initial image, and FIG. 10B represents a state where partial reservation data is inputted.

On the displayed image of a reserved recording set menu shown in FIG. 10B, "Timer set check" is selected by means of cursor keys.

The user reserves a desired program by manipulating the up, down, left and right (↑, ↓, ←, →)cursor keys.

A reservation of one program is completed when the whole data of the broadcast date, start hour, end hour, recording speed and Pos (channel) of the program have been entirely inputted. Unless these whole data are inputted, a reservation of the program is not settled.

Such setting of reservation is executed per program.

FIG. 10B shows an exemplary menu displayed when reservations of three programs have been settled.

In this example, the first is "Program 1 (Pos1: NEDL) of Apr. 20, 1996 (Saturday), 7:00–8:00"; the second is "Program 4 (Pos4: BBC1) of Apr. 20, 1996 (Saturday), 9:00–12:30"; and the third is "Program 2 (Pos2: NED2) of Apr. 21, 1996 (Sunday), 20:00–21:00".

Upon completion of setting a reservation of one program, its content is entirely written in fifth memory 21b shown in FIGS. 1 and 2B.

Subsequently the adjust time of Pos of the reservation content thus set is read out from the sixth memory 21c shown in FIGS. 1 and 3A.

For example, in the reservation of FIG. 10B where the channel of Program 1 is Pos1, the adjust time of Pos1 is detected to be "+0" from the sixth memory 21c shown in FIGS. 1 and 3A.

Thereafter the adjust time "+0" is added to the start hour 9:00 of the reserved program for adjusting the same to obtain corrected PIL, i.e., 7:00, which is then stored in the corresponding storage area of the fifth memory 21b shown in FIGS. 1 and 2B.

In the case of Program 2, the channel is Pos4 and its adjust time is detected to be "−1" from the sixth memory 21c shown in FIGS. 1 and 3A.

Therefore the adjust time "−1" is added to the start hour 7:00 of the reserved program for adjusting the same to obtain corrected PIL, i.e., 8:00, which is then stored in the corresponding storage area of the fifth memory 21b shown in FIGS. 1 and 2B.

If another program is to be reserved after completion of input for one program, a similar process is executed again.

When the reservation mode is to be terminated, the user pushes the "EXECUTE" key of the remote commander 11.

Processes for the above-described setting of program reservation are shown in a flowchart.

Figure 11:
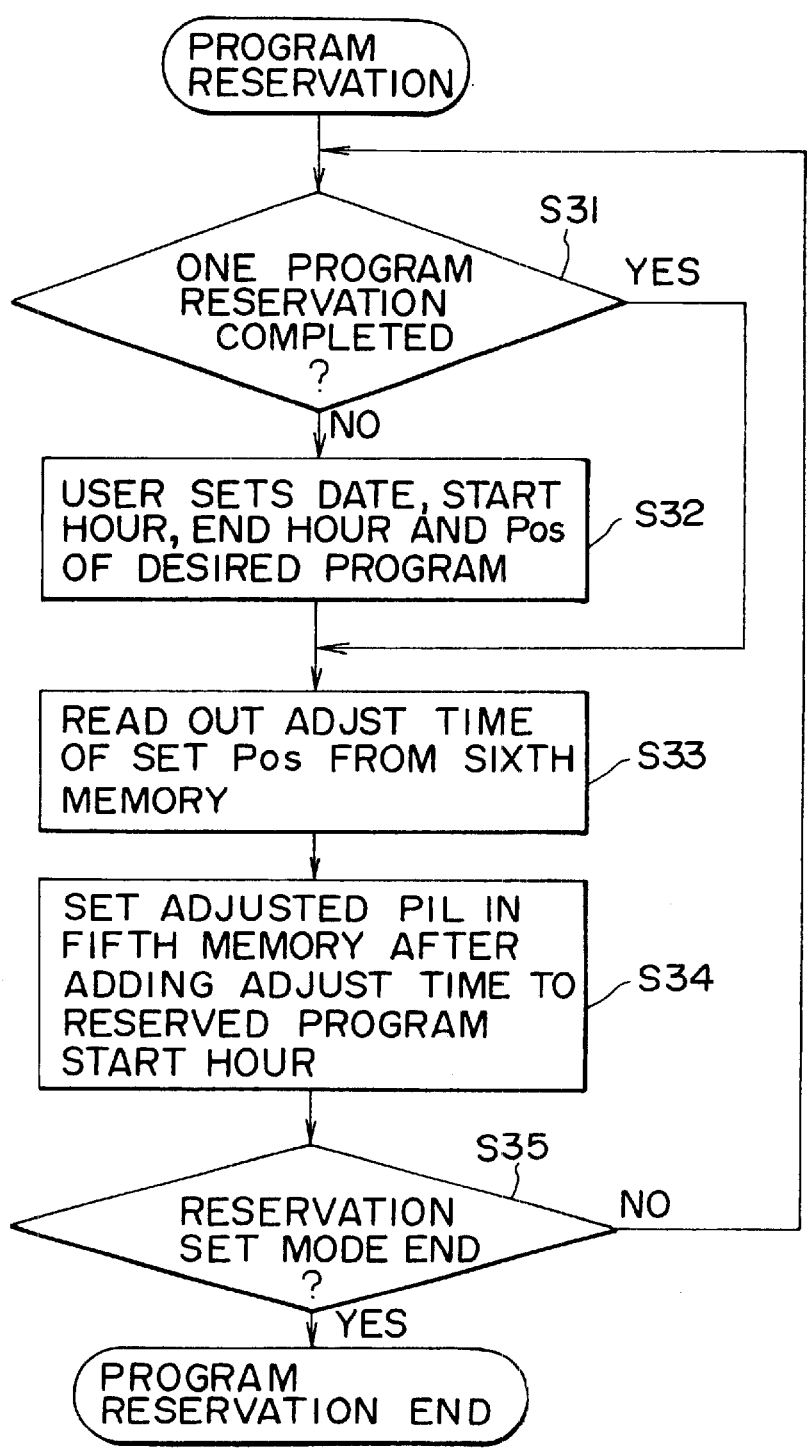
FIG. 11 is a flowchart showing a principal processing flow in a program reservation setting mode in the video recording apparatus of the invention.

FIG. 11 is a flowchart showing principal processes executed for setting of program reservation in the video recording apparatus of the present invention. In this chart, S31–S35 denote processing steps.

First at step S31, a decision is made as to whether a reservation of one program has been completed or not.

And if the result of this decision signifies no completion of a reservation of one program, the operation proceeds to step S32, where the date, start hour, end hour and Pos of the desired program are set.

Meanwhile, if the result of the above decision signifies completion of a reservation of one program, the operation proceeds step S33, where the adjust time of the set Pos is read out from the sixth memory 21c shown in FIG. 3A.

Thereafter at step S34, corrected PIL is calculated by adding the adjust time to the start hour of the reserved program and then is stored in the corresponding storage area of the fifth memory 21b shown in FIG. 2B.

Subsequently at step S35, a decision is made as to whether the reservation set mode has been terminated or not.

And if the result of this decision signifies no termination of the reservation set mode, the operation returns to step S31 again, and a similar process is repeated.

Meanwhile, in case the result of the above decision signifies termination of the reservation set mode, the processing flow of FIG. 11 is brought to an end.

Finally, an explanation will be given on the reserved recording operation performed in the video recording apparatus of the present invention equipped with a reserved recording function.

When the power supply for the apparatus is switched off after reservation of any program, the apparatus is placed in a reserved recording standby or execution mode.

And then the Pos (channel) of the reserved program is selected.

In case a plurality of programs are reserved, the Pos (channel) of Program 1 is selected first.

The program data (PIL) is detected from the broadcast signal of the selected Pos1 and is compared with the corrected PIL of Program 1 stored in the fifth memory 21b of FIGS. 1 and 2B.

And if a coincidence is attained therebetween, Program 1 begins to be recorded.

Meanwhile, in case no coincidence is attained, a decision is made as to whether the reserved program is being recorded or not. And if the result of this decision is affirmative, a predetermined process is executed to terminate the recording, and there is deleted the entire reservation content for Program 1 stored in the fifth memory 21b.

When there is any other reserved program, a similar process is executed again. Meanwhile, in case there is none of reserved program, the reserved recording standby or execution mode is brought to an end.

The above processing operation is shown in a flowchart.

Figure 12:
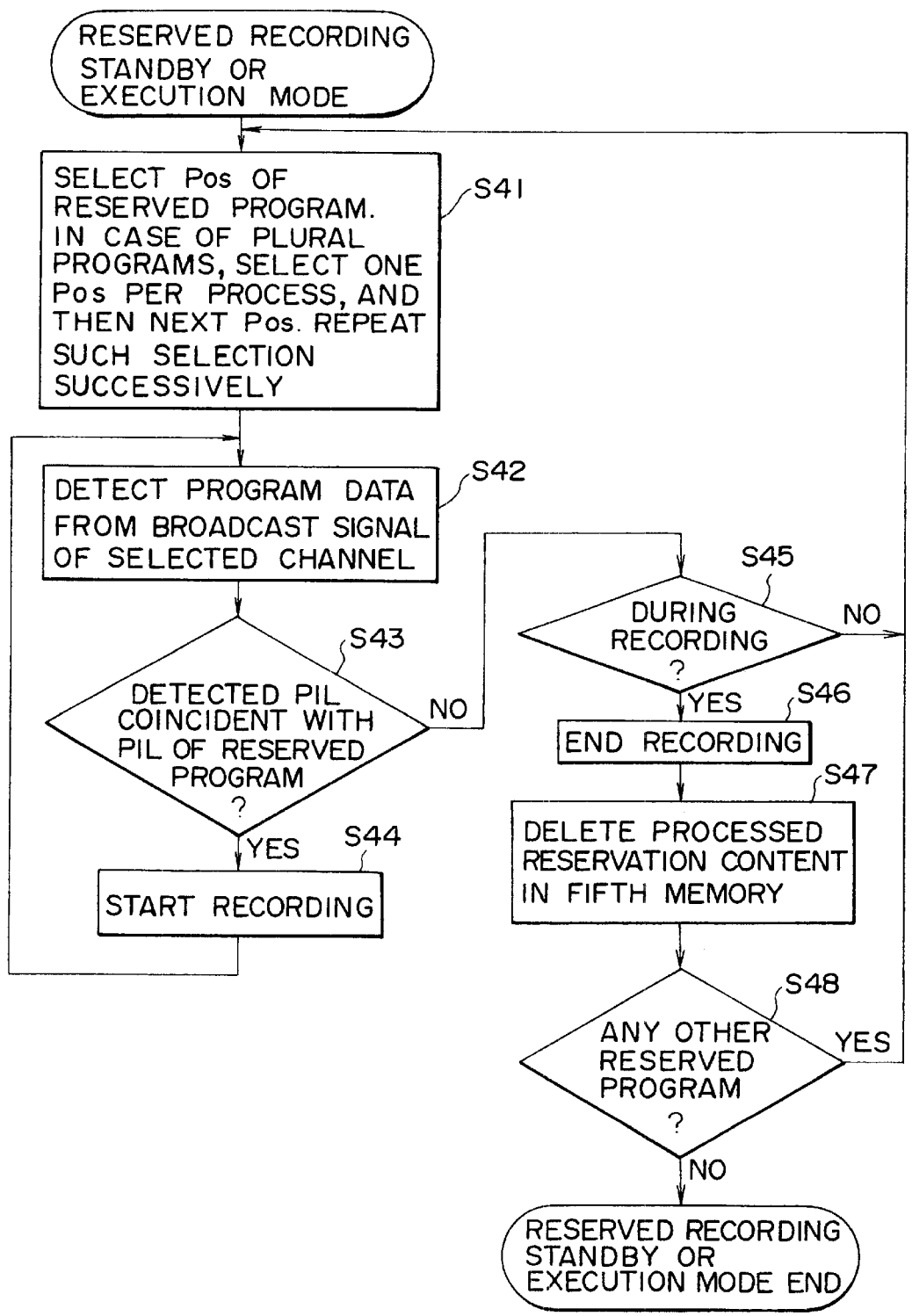
FIG. 12 is a flowchart showing a principal processing flow in a reserved recording standby mode or a recording execution mode in the video recording apparatus of the invention.

FIG. 12 is a flowchart of principal processes executed in a reserved recording standby or execution mode in the video recording apparatus of the present invention. In this chart, S41 to S48 denote processing steps.

When the power supply for the apparatus is switched off after reservation of any program, the apparatus is placed in a reserved recording standby or execution mode, and the processing flow of FIG. 12 is started.

Initially at step S41, the Pos (channel) of the reserved program is selected.

In case a plurality of programs are reserved, the Pos (channel) of Program 1 is selected first.

Subsequently at step S42, the program data (PIL) is detected from the broadcast signal of the selected Pos.

Thereafter at next step S43, the detected PIL is compared with the corrected PIL (broadcast start hour) of Program 1 stored in the fifth memory 21b of FIG. 2B.

And if a coincidence is attained between the detected PIL and the stored corrected PIL, the operation proceeds to step S44, where Program 1 begins to be recorded. Subsequently the operation returns to step S42 again, and a similar process is executed.

Meanwhile, in case no coincidence is attained between the two PIL data, a decision is made at step S45 as to whether the reserved program is being recorded or not.

And if the result of this decision is affirmative, the operation proceeds to step S46, where a predetermined process is executed to terminate the recording.

Subsequently at step S47, there is deleted the entire data relative to the program reservation stored in the fifth memory 21b of FIG. 2B, and then the operation proceeds to step S48 to make a decision as to whether any other reserved program is existent or not.

And when there is any other reserved program, the operation returns to step S41 again, and a similar process is executed with regard to Program 2.

Meanwhile, in case the result of the decision at step S45 signifies that no recording is being performed, the operation returns to step S41, and a similar process is executed with regard to Program 2.

And upon detection at step S48 that there is no more program reservation data, the processing flow in the reserved recording standby or execution mode of FIG. 12 is brought to an end.

Thus, according to the present invention, when a program of UK BBC1 for example is reserved at the Netherlands time in the Netherlands having a time difference from the UK where the broadcasting station is sited, the PIL superimposed on the broadcast signal from the UK station coincides with the corrected PIL, so that reserved recording can be properly executed with certainty.

The program ID, i.e., PIL superimposed on the broadcast signal from the station, is normally not changed despite any extension of the program or any change of the program start hour, hence enabling execution of reserved recording if a coincidence is attained between the corrected PIL and the PIL of the changed program.

In the video recording apparatus of the present invention having such a reserved recording function, there is prepared a time difference table to store the data of time differences between the sites of broadcasting stations and a receiving site. And when program ID is to be stored as reservation data, the program ID is corrected with reference to the time difference table and then the corrected data is stored.

Consequently, it becomes possible to achieve reserved recording of any desired program from a station of a time-different country in conformity with broadcast service such as PDC or VPS, hence enhancing the operability of the apparatus.

Further, a proper operation can be performed in compliance with any extension of a program or any change thereof.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. A video recording apparatus having a reserved recording function for recording programs broadcast in the future, said apparatus comprising:

means for storing reservation data which includes at least a recording start time and program information;

means for searching a program ID data superimposed a broadcast signal for determining when the reservation data and program ID data match; said program ID data including at least a signal broadcast time and program information;

means for adjusting said recording start time to account for a time difference by referring to a time difference area table which calculates a time difference between a broadcasting site and a receiving site based on the inputting of data indicating where the broadcast signal is received;

means for storing the adjusted recording start time; and means for recording the program broadcast in the future when said signal broadcast time is at least the adjusted recording start time and the program information from said program ID data and the program reservation data match.

2. The video recording apparatus according to claim 1, wherein said program ID data includes the broadcast start hour.

3. The video recording apparatus according to claim 1 wherein the adjusted recording start time represents the hour at the broadcast site.

4. A video recording method with a reserved recording function for recording programs broadcast in the future, said method comprising the steps of:

storing program reservation data including at least a recording start time and program information;

searching a program ID data superimposed on a broadcast signal for determining when the reservation data and program ID data match; said program ID data including at least a signal broadcast time and program information;

adjusting said recording start time to account for a time difference by referring to a time difference area table which calculates a time difference between a broadcasting site and a receiving site based on the inputting of data indicating where the broadcast signal is received; and recording the program broadcast in the future when said signal broadcast time is at least the adjusted recording start time and the program information from said program ID data and the program reservation data match.

5. The video recording method according to claim 4, wherein said program ID data includes the broadcast start hour.

6. The video recording method according to claim 4, wherein the adjusted recording start time represents the hour at the broadcast site.

* * * * *